US009885830B2

(12) United States Patent
Heaton et al.

(10) Patent No.: US 9,885,830 B2
(45) Date of Patent: Feb. 6, 2018

(54) SEMICONDUCTOR OPTICAL WAVEGUIDE DEVICE

(71) Applicant: Lumentum Operations LLC, Milpitas, CA (US)

(72) Inventors: John M. Heaton, San Jose, CA (US); Oleg Bouevitch, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/443,601

(22) Filed: Feb. 27, 2017

(65) Prior Publication Data

US 2017/0235048 A1    Aug. 17, 2017

Related U.S. Application Data

(62) Division of application No. 14/810,819, filed on Jul. 28, 2015, now Pat. No. 9,588,296.

(51) Int. Cl.
| | |
|---|---|
| *G02F 1/01* | (2006.01) |
| *G02B 6/13* | (2006.01) |
| *G02B 6/14* | (2006.01) |
| *G02B 6/122* | (2006.01) |
| *G02B 6/125* | (2006.01) |

(52) U.S. Cl.
CPC ............. *G02B 6/131* (2013.01); *G02B 6/122* (2013.01); *G02B 6/125* (2013.01); *G02B 6/14* (2013.01)

(58) Field of Classification Search
CPC ........ G02B 6/131; G02B 6/122; G02B 6/125; G02B 6/14; G02B 2006/12123; G02B 2006/12142; G02B 2006/12147

USPC .......................................... 385/1–9, 129–132
See application file for complete search history.

(56) References Cited

U.S. PATENT DOCUMENTS

| | | | |
|---|---|---|---|
| 5,790,583 A | 8/1998 | Ho | |
| 6,081,632 A | 6/2000 | Yoshimura et al. | |
| 6,122,419 A | 9/2000 | Kurokawa et al. | |
| 6,169,757 B1 | 11/2001 | Merritt | |
| 6,404,951 B2 * | 6/2002 | Danziger | G02B 6/14 385/123 |
| 6,987,784 B2 | 1/2006 | Woodley et al. | |
| 7,068,870 B2 | 9/2006 | Steinberg et al. | |
| 7,218,809 B2 | 5/2007 | Zhou et al. | |
| 7,315,683 B2 | 1/2008 | Beall et al. | |
| 7,340,138 B1 * | 3/2008 | Yablon | G02B 6/0288 385/123 |
| 7,426,328 B2 | 9/2008 | Zhou et al. | |
| 7,577,327 B2 | 8/2009 | Blauvelt et al. | |
| 7,783,146 B2 | 8/2010 | Blauvelt et al. | |

(Continued)

OTHER PUBLICATIONS

Monolithic integrated asymmetric grade and step index couplers for microphotonic waveguides by Delagee et al, publsihed in 2005 by OSA.*

*Primary Examiner* — Ryan Lepisto
*Assistant Examiner* — Guy Anderson
(74) *Attorney, Agent, or Firm* — Harrity & Harrity, LLP

(57) ABSTRACT

A semiconductor waveguide optical device and a method of manufacturing of a semiconductor optical device are disclosed. The semiconductor waveguide optical device may include a gradient index waveguide for mode conversion and/or vertical translation of optical modes of step-index waveguides, which may be disposed on or over a same substrate as the gradient index waveguide. The gradient index waveguide may be epitaxially grown.

20 Claims, 20 Drawing Sheets

(56) References Cited

U.S. PATENT DOCUMENTS

| | | | |
|---|---|---|---|
| 7,853,103 B2 | 12/2010 | Blauvelt et al. | |
| 7,860,360 B2 * | 12/2010 | Rockwell | G02B 6/1245 385/28 |
| 7,885,499 B2 | 2/2011 | Blauvelt et al. | |
| 8,346,039 B2 | 1/2013 | Lu et al. | |
| 8,358,885 B2 | 1/2013 | Jeong | |
| 8,538,208 B2 | 9/2013 | Ho et al. | |
| 9,459,414 B2 * | 10/2016 | Suh | G02B 6/4206 |
| 9,588,296 B2 | 3/2017 | Heaton | |
| 2003/0044118 A1 | 3/2003 | Zhou et al. | |
| 2010/0158443 A1 | 6/2010 | Jeong | |
| 2010/0189401 A1 * | 7/2010 | Shkunov | H01S 3/06708 385/129 |
| 2013/0114924 A1 | 5/2013 | Loh et al. | |
| 2015/0016775 A1 | 1/2015 | Ho et al. | |
| 2015/0125111 A1 | 5/2015 | Orcutt et al. | |
| 2015/0260916 A1 * | 9/2015 | Cherchi | G02B 6/125 385/32 |
| 2016/0018610 A1 * | 1/2016 | Krishnamurthi | G02B 6/4214 385/31 |
| 2017/0131472 A1 * | 5/2017 | Kobyakov | G02B 6/14 |

\* cited by examiner

SEMICONDUCTOR OPTICAL WAVEGUIDE DEVICE

RELATED APPLICATION

This application is a division of U.S. patent application Ser. No. 14/810,819, filed Jul. 28, 2015 (now U.S. Pat. No. 9,588,296) which is incorporated herein by reference.

TECHNICAL FIELD

The present disclosure relates to optical devices, and in particular to semiconductor optical waveguide devices.

BACKGROUND

Miniaturization of optical, electro-optical, and optoelectronic components and modules is reaching a stage where complex optical, electro-optical, and opto-electronic functionalities may be realized on a single semiconductor chip termed "photonic integrated circuit". A photonic integrated circuit may include optical waveguides and other microoptical structures.

Photonic integrated circuits may be used for separation, modulation, demodulation, and detection of optical signals, making them attractive for optical communications systems. Furthermore, photonic integrated circuits may be compatible with electronic circuitry, which enables such functions as transmission, reception, and modulation of light on a single chip.

Despite the progress of optical integration of multiple functionalities of photonic integrated circuits, the task of coupling light between different waveguides of a same or a different photonic integrated circuit, and between a photonic integrated circuit and an optical fiber remains challenging. Optical modes guided by planar waveguides of different size and/or different refractive index contrast may differ considerably in size and shape. An optical waveguide mode is usually much smaller in size than an optical mode guided by a singlemode optical fiber or fibers, which are used to optically couple a photonic integrated circuit to an outside environment. A semiconductor-based optical mode converter may be used to provide conversion between optical modes of different sizes, shapes, and different vertical positions relative to the semiconductor substrate.

One prior-art solution of a problem of an optical mode conversion and vertical displacement includes using vertical couplers to couple light from a lower optical waveguide to a differently sized upper optical waveguide, or vice versa. Another solution is to use waveguide tapers having physical thickness varying in vertical direction, and/or a width varying in a horizontal direction. These techniques are rather costly and may be difficult to implement in production environment, especially for vertical direction.

Waveguide tapers are perhaps most frequently used for conversion between different optical mode sizes of planar waveguides. Waveguide tapers may also be used for coupling light between a waveguide and an external optical fiber. However, waveguide tapers typically have to be made long enough to ensure an adiabatic mode transformation to avoid considerable optical losses. Long waveguide tapers tend to occupy a considerable area on a photonic chip, especially if an array of such tapers is required to optically couple an array of optical fibers to a photonic chip.

Therefore, the prior art appears lacking a manufacturable and reproducible semiconductor optical waveguide device capable of optical mode size conversion and/or vertical displacement of optical modes.

SUMMARY

In accordance with an aspect of the disclosure, there is provided a method of manufacturing a semiconductor optical waveguide device, the method comprising:

growing on a substrate a base waveguide comprising one of:

i) a gradient index waveguide comprising a local refractive index depending on a growth parameter, wherein the growing comprises varying the growth parameter so as to gradually increase the local refractive index to a maximum value, and then to gradually decrease the local refractive index, whereby upon completion of the growing, the gradient index waveguide comprises a transversal bell-shaped refractive index profile defining an optical axis comprising the maximum value of the transversal bell-shaped refractive index profile;

ii) a first step index waveguide comprising a first waveguide core comprising a first core thickness and a first refractive index; and iii) a second step index waveguide comprising a second waveguide core comprising a second core thickness and a second refractive index;

forming a first recess in the base waveguide by removing a first portion thereof to a first depth;

forming a different one of the gradient index waveguide, the first step index waveguide, and the second step index waveguide in the first recess;

forming a second recess in at least one of the waveguides formed heretofore on the substrate, by removing a second portion thereof to a second depth;

forming the remaining one of the gradient index waveguide, the first step index waveguide, and the second step index waveguide in the second recess;

wherein upon growing the gradient index waveguide and the first and second step index waveguides, an optical path is formed comprising in sequence the first waveguide core, the gradient index waveguide, and the second waveguide core.

In one exemplary embodiment, the first and second recesses are formed in the gradient index waveguide, wherein the first step index waveguide is formed in the first recess, and the second step index waveguide is formed in the second recess. Forming at least one of: the gradient index waveguide, the first step index waveguide, and the second step index waveguide may include epitaxial growing. The epitaxial growing may enable the bell-shaped refractive index profile to be varying smoothly and monotonically, substantially without creating micro-steps in the refractive index profile.

The method may also include forming a second recess in the gradient index waveguide, and forming the second step index waveguide in the second recess. The second recess may be created by removing a second portion of the gradient index waveguide opposite the first portion to a second depth, thereby defining a length of the gradient index waveguide in between the first and second step index waveguides.

In accordance with the disclosure, there is further provided a semiconductor optical waveguide device comprising:

a substrate;

a first step index waveguide on the substrate, the first step index waveguide comprising a first waveguide core comprising a first core thickness and a first refractive index;

a gradient index waveguide on the substrate, the gradient index waveguide abutting the first step index waveguide and comprising a length and a transversal gradually varying bell-shaped refractive index profile defining an optical axis comprising a maximum value of the transversal gradually varying bell-shaped refractive index profile; and a second step index waveguide over the substrate, the second step index waveguide abutting the gradient index waveguide and comprising a second waveguide core comprising a second core thickness and a second refractive index;

wherein the semiconductor optical waveguide device comprises an optical path comprising in sequence the first waveguide core, the gradient index waveguide, and the second waveguide core.

In one embodiment, the first and second step index waveguides abut the gradient index waveguide on its opposite sides of the gradient index waveguide.

The transversal bell-shaped refractive index profile may include a substantially parabolic vertically varying refractive index profile characterized by a repeat length L of an optical field propagating in the gradient index waveguide, wherein the length of the gradient index waveguide between the first and second step index waveguides is substantially equal to LM/4, wherein M is an integer, wherein $L=2\pi/\delta n_{eff} k_0$, wherein $n_{eff}$ is an effective refractive index step between the at least two optical modes, and $k_0$ is a wavenumber of a zero-order optical mode propagating in the gradient index waveguide. The optical field may include at least two optical modes.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
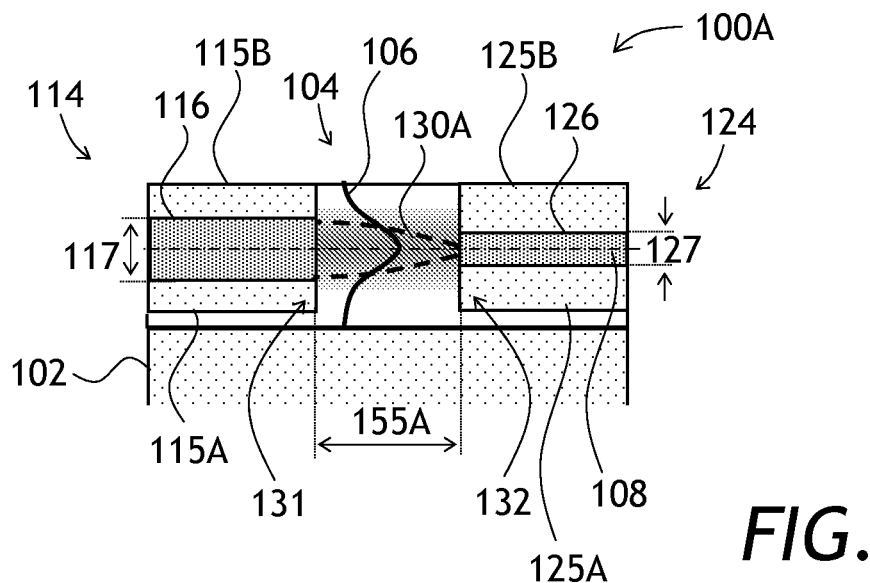
FIG. 1A illustrates an elevational cross-sectional view of a semiconductor optical waveguide mode converter device of the present disclosure.
Figure 1B:
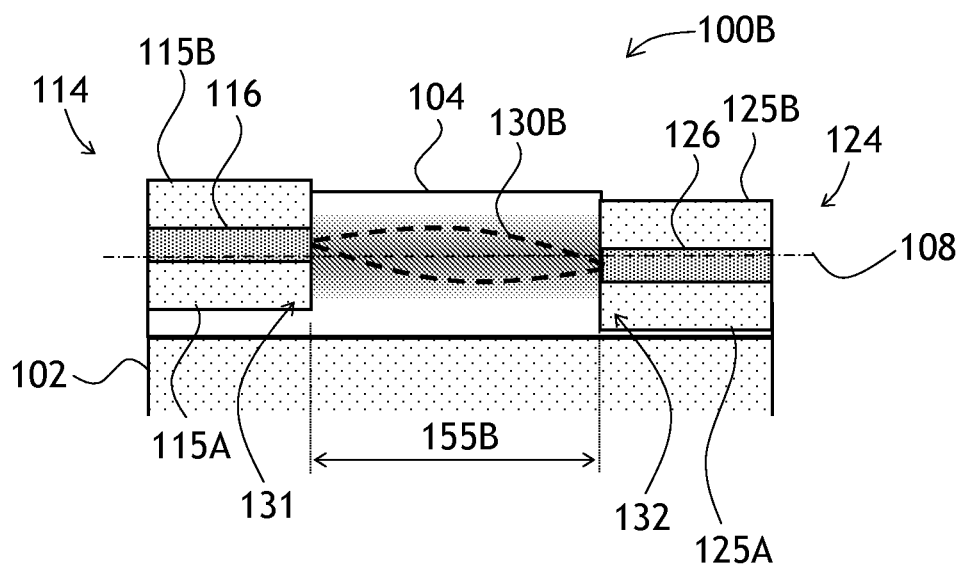
FIG. 1B illustrates an elevational cross-sectional view of a semiconductor optical waveguide mode vertical displacer device of the present disclosure.
Figure 1C:
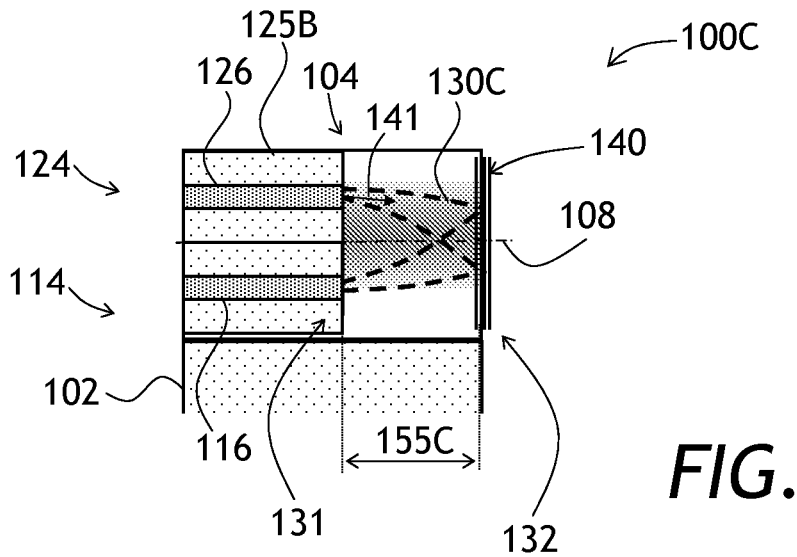
FIG. 1C illustrates an elevational cross-sectional view of a reflective version of the semiconductor optical waveguide mode vertical displacer device of FIG. 1B.

Referring to FIGS. 1A to 1C, semiconductor optical waveguide devices 100A (FIG. 1A), 100B (FIG. 1B), and 100C (FIG. 1C) may each include a substrate 102 and a first step index waveguide 114 on the substrate 102. The first step index waveguide 114 may include a first waveguide core 116 having a first core thickness 117 (FIG. 1A) and a first refractive index $n_1$. The first waveguide core 116 may be disposed between lower 115A and upper 115B cladding layers having refractive indices smaller than the first refractive index $n_1$. More than two cladding layers 115A and 115B may be provided in the first step index waveguide 114.

A gradient index waveguide 104 abutting the first step index waveguide 114 may be disposed on the substrate 102. The gradient index waveguide 104 may have a length 155A (FIG. 1A); 155B (FIG. 1B); and 155C (FIG. 1C). The gradient index waveguide 104 may have a transversal gradually varying bell-shaped refractive index profile 106 (FIG.

1A), which defines a optical axis 108 as including a maximum value of the transversal gradually varying bell-shaped refractive index profile 106. Herein, the term "transversal" means across to the optical axis 108, e.g. perpendicular to the optical axis 108.

A second step index waveguide 124 may be disposed over the substrate 102. The second step index waveguide 124 may abut the gradient index waveguide 104. The second step index waveguide 124 may have a second waveguide core 126 having a second core thickness 127 (FIG. 1A) and a second refractive index $n_2$. The second waveguide core 126 may be disposed between lower 125A and upper 125B cladding layers having refractive indices smaller than the second refractive index $n_2$. More than two cladding layers 125A and 125B may be provided in the second step index waveguide 124. The first step index waveguide 114, the gradient index waveguide 104, and the second step index waveguide 124 may form an optical path 130A (FIG. 1A), 130B (FIG. 1B), and 130C (FIG. 1C), shown in thick dashed line.

Referring specifically to FIG. 1A, the first 114 and second 124 step index waveguides of the semiconductor optical waveguide device 100A may abut the gradient index waveguide 104 on opposite first 131 and second 132 sides of the gradient index waveguide 104. By way of a non-limiting example, the first 116 and second 126 waveguide cores may be centered on the optical axis 108 as shown. The first core 116 thickness 117 may differ from the second core thickness 127, and the first core refractive index $n_1$ may differ from the second core refractive index $n_2$. For example, the first core 116 thickness 117 may be larger than the second core 126 thickness 127, and/or the first core refractive index $n_1$ may be smaller than the second core refractive index $n_2$. The length 155A of the gradient index waveguide 104 and the gradually varying bell-shaped refractive index profile 106 may be selected so as to cause a mode size transformation by the gradient index waveguide 104 from a mode size of the first step index waveguide 114 to a mode size of the second step index waveguide 124, as shown by an optical path 130A. The selection of the length 155A and the selection of the gradually varying bell-shaped refractive index profile 106 will be considered in detail further below.

Referring specifically to FIG. 1B, the first 114 and second 124 step index waveguides of the semiconductor optical waveguide device 100B may abut the gradient index waveguide 104 on the opposite sides 131 and 132 of the gradient index waveguide 104. By way of a non-limiting example, a center of the first waveguide core 116 may be disposed above the optical axis 108, and a center of the second waveguide core 126 may be disposed below the optical axis 108, as shown in FIG. 1B. The length 155B of the gradient index waveguide 104 and the gradually varying bell-shaped refractive index profile 106 may be selected so as to preserve the mode size.

The gradually varying bell-shaped refractive index profile 106 includes continuous refractive indices having a quadratic i.e. parabolic shape through the core of the waveguide 104. Other bell-shaped refractive index profiles 106 are also contemplated where the index profile 106 includes larger indices of refraction close to the optical axis 108 which indices decrease as the distance from the core or the optical axis increases. The shape of the index profile 106 may be less strictly constrained at distances away from the core (or into the cladding), which are distant from the optical axis.

Referring specifically to FIG. 1C, the first step index waveguide 114 of the semiconductor optical waveguide device 100C may be disposed under the second step index waveguide 124, so that the first 114 and second 124 step index waveguides abut the gradient index waveguide 104 on the same first side 131 of the gradient index waveguide 104. The semiconductor optical waveguide device 100C may further include a mirror surface 140 optically coupled to the second side 132 of the gradient index waveguide 104. In operation, light 141 emitted from the first step index waveguide 114 propagates through the gradient index waveguide 104, is reflected by the mirror surface 140, propagates back through the gradient index waveguide 104, and impinges on the second step index waveguide 124. The length 155C of the gradient index waveguide 104 and the gradually varying bell-shaped refractive index profile 106 may be selected so as to preserve the mode size.

Figure 1D:
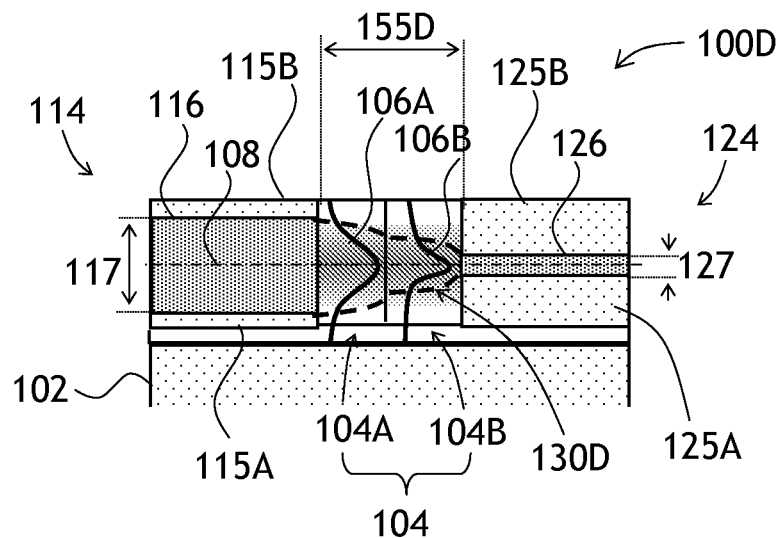
FIG. 1D illustrates an elevational cross-sectional view of a semiconductor optical waveguide device including a gradient index waveguide having two distinct portions.

Turning now to FIG. 1D with further reference to FIG. 1A, a semiconductor optical waveguide device 100D is a variant of the semiconductor optical waveguide device 100A of FIG. 1A. The gradient index waveguide 104 of the semiconductor optical waveguide device 100D of FIG. 1D may include a first gradient index waveguide portion 104A and a second gradient index waveguide portion 104B abutting the first gradient index waveguide portion 104A. The first gradient index waveguide portion 104A may include a transversal gradually varying bell-shaped refractive index profile 106A having a first width, and the second gradient index waveguide portion 104B may include a transversal gradually varying bell-shaped refractive index profile 106B comprising a second width different from the first, for example smaller than the first width, as shown. A length 155D of the gradient index waveguide 104 is the sum of the first width and the second width. The first step index waveguide 114, the first gradient index waveguide portion 104A, the second gradient index waveguide portion 104B, and the second step index waveguide 124 may form an optical path 130D shown in FIG. 1D in thick dashed line. This enables one to achieve larger magnification or de-magnification factors of the optical mode transformation, to match optical modes of the first 114 and second 124 step index waveguides of different sizes.

The semiconductor optical waveguide devices 100A, 100B, 100C, 100D provide a substantially reduced physical size compared to existing comparable devices, especially for III-V semiconductors and for indium phosphide (InP). In some indium phosphide embodiments, the length 155A, 155B, and 155C may be on the order of 10 micrometers to 50 micrometers. The length 155D of the gradient index waveguide 104 may be on the order of 20 micrometers to 200 micrometers.

Figure 2A:
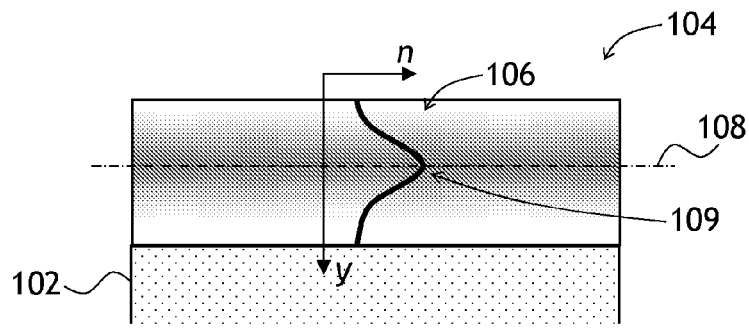
FIGS. 2A to 2F illustrate elevational cross-sectional views of a semiconductor optical waveguide device of FIG. 1A at different progressive stages of manufacturing.

A manufacturing method of a semiconductor optical waveguide device will now be considered, using the semiconductor optical waveguide device 100A of FIG. 1A as a non-limiting example. Referring to FIG. 2A, the gradient index waveguide 104 may be formed on the substrate 102. For example, the gradient index waveguide 104 may be epitaxially grown on the substrate 102, so that a local refractive index n depends on a growth parameter. The growing may include varying the growth parameter so as to gradually increase the local refractive index n to a maximum value 109, and then to gradually decrease the local refractive index n. Upon completion of the growing, the gradient index waveguide 104 may have the transversal bell-shaped refractive index profile 106 n(y), where y is the vertical coordinate. The transversal bell-shaped refractive index profile 106 may define the optical axis 108, which includes the maximum value 109 of the transversal bell-shaped refractive index profile 106.

Figure 2B:
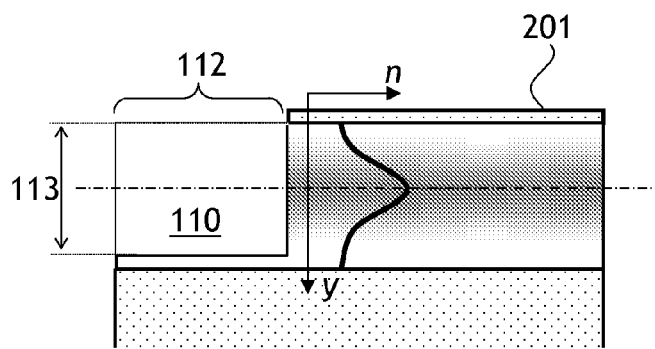

Referring to FIG. 2B, a first recess 110 may be formed in the gradient index waveguide 104 by removing a first portion 112 of the gradient index waveguide 104 to a first depth 113. To that end, a first mask layer 201 may be formed over a remaining length of the gradient index waveguide, and the first portion 112 of the gradient index waveguide 104 may be etched away using a suitable etchant.

Figure 2C:
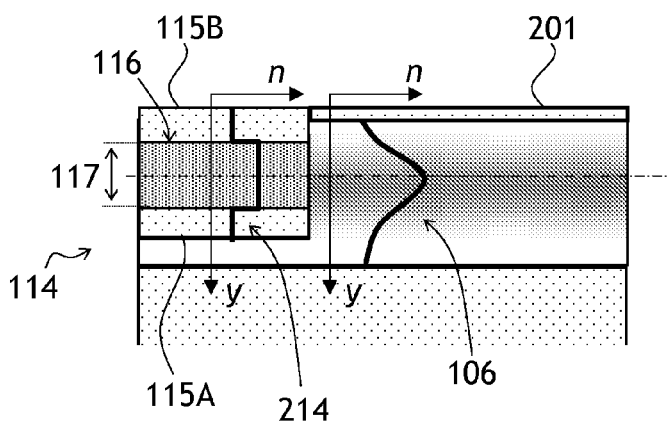

Referring to FIG. 2C, the first step index waveguide 114 may be formed in the first recess 110, e.g. by epitaxial growth. The lower waveguide cladding layer 115A, the first waveguide core 116, and the upper waveguide cladding layer 115B may be formed in sequence one on top of another, so as to create a first stepped refractive index profile 214. In some embodiments, more layers may be formed in the first step index waveguide 114 corresponding to multiple steps in the first stepped refractive index profile 214. Then, the first mask layer 201 may be stripped.

Figure 2D:
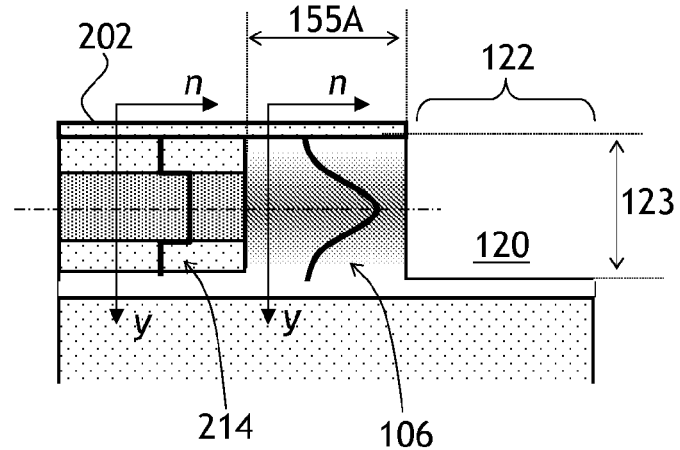

The second step index waveguide 124 having a second stepped refractive index profile 224 may be formed, e.g. epitaxially grown, on or over the substrate 102 in a similar manner. By way of a non-limiting example, referring to FIG. 2D, a second recess 120 may be formed in the gradient index waveguide 104 by removing a second portion 122 of the gradient index waveguide 104 opposite the first portion to a second depth 123, thereby defining the length 155A of the gradient index waveguide 104 in between. To form the second recess 120, a second mask layer 202 may be formed over the length 155A of the gradient index waveguide 104, and over the first step index waveguide 114. Then, the second portion 122 of the gradient index waveguide 104 may be etched away using a suitable etchant.

Figure 2E:
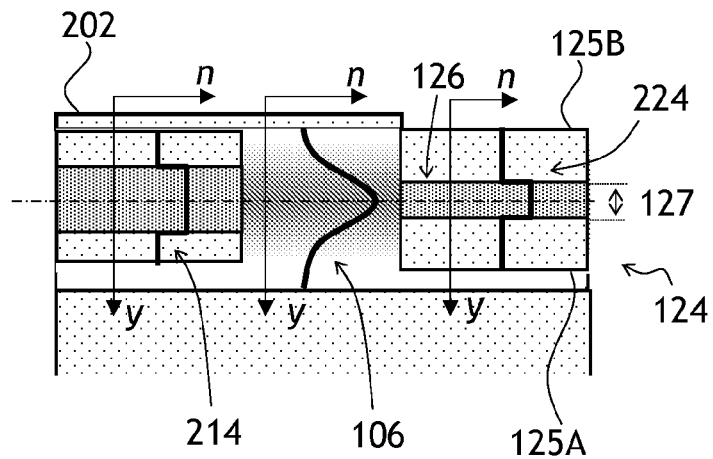

Referring to FIG. 2E, the second step index waveguide 124 may be formed in the second recess 120, e.g. by epitaxial growth. The lower waveguide cladding layer 125A, the second waveguide core 126, and the upper waveguide cladding layer 125B may be formed in succession so as to create a second stepped refractive index profile 224. In some embodiments, more layers may be formed in the second step index waveguide 124 corresponding to multiple steps in the second stepped refractive index profile 224. Then, the second mask layer 202 may be stripped.

Figure 2F:
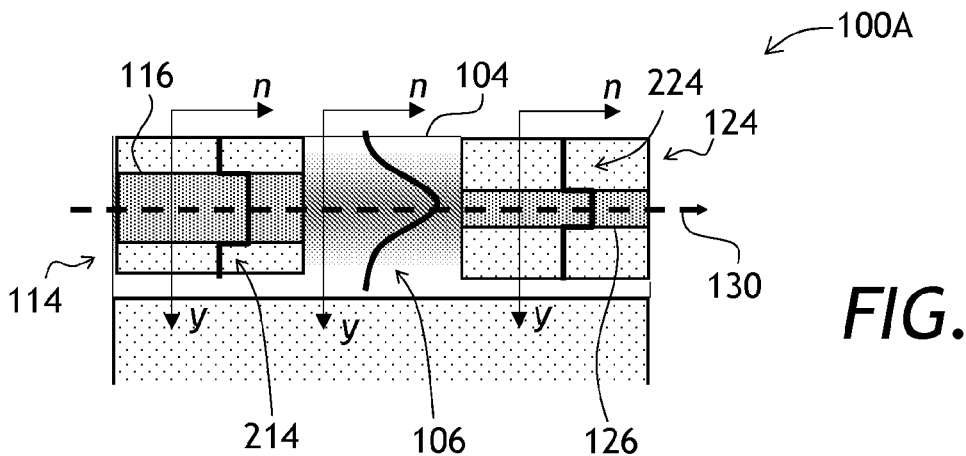

Turning now to FIG. 2F, the manufactured semiconductor optical waveguide device 100A is shown. Upon growing the gradient index waveguide 104 and the first 114 and second 124 step index waveguides, the optical path 130 is formed. The optical path 130 may include in sequence the first waveguide core 116, the gradient index waveguide 104, and the second waveguide core 126. A similar method may be used to make the semiconductor optical waveguide device 100B of FIG. 1B with offsets to the first 114 and second 124 step index waveguides. The above described method may also be used to manufacture the semiconductor optical waveguide device 100C of FIG. 1C. In the latter case, the second recess 120 may be omitted or used to form the vertical mirror surface 140 while the first recess 110 may be of a depth to accommodate forming the second step index waveguide 124 and then the first step index waveguide 114 on top of the second step index waveguide 124.

The above described method may also be used to manufacture the semiconductor optical waveguide device 100D of FIG. 1D. Specifically, growing the gradient index waveguide 104 may include growing the first gradient index waveguide portion 104A and growing the second gradient index waveguide portion 104B abutting the first gradient index waveguide portion 104A, for example by etching a recess lithographically and growing the second gradient index waveguide portion 104B in the recess. Similarly to the semiconductor optical waveguide device 100A of FIG. 1A, growing the first gradient index waveguide portion 104A may include varying the growth parameter so as to gradually increase the local refractive index to a maximum value, and then to gradually decrease the local refractive index, so that upon completion of the growing the first gradient index waveguide portion 104A, the first gradient index waveguide portion has the transversal bell-shaped refractive index profile 106A. Similarly, growing the second gradient index waveguide portion 104B may include varying the growth parameter so as to gradually increase the local refractive index to a maximum value, and then to gradually decrease the local refractive index, so that upon completion of the growing the second gradient index waveguide portion 104B, the second gradient index waveguide portion has the transversal bell-shaped refractive index profile 106B.

Figure 10:
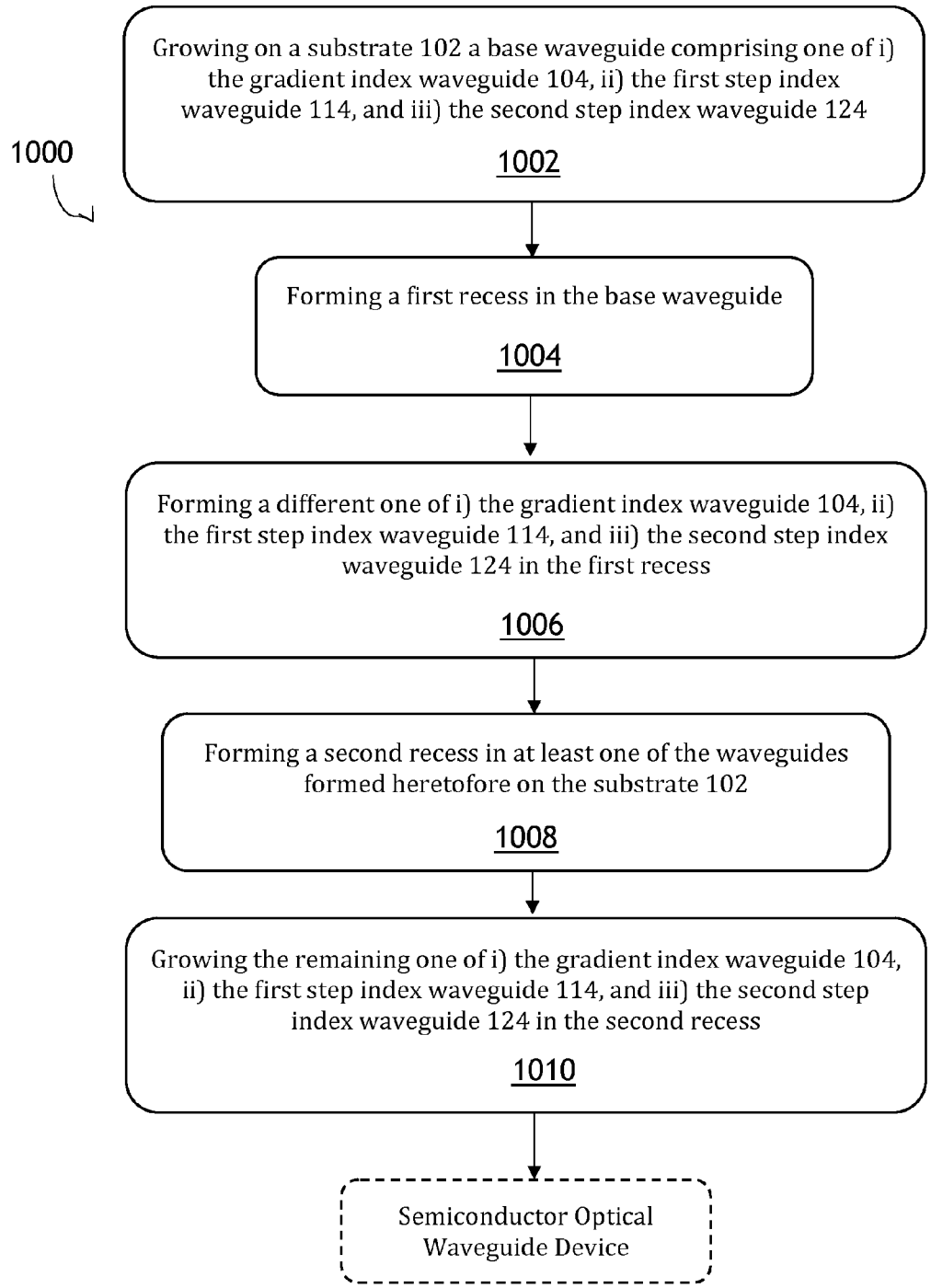
FIG. 10 illustrates an example method for manufacturing a semiconductor optical waveguide device of the present disclosure.

The order of growing the gradient index waveguide 104, the first step index waveguide 114, and the second step index waveguide 124 may be varied. As illustrated in FIG. 10, a method 1000 of manufacturing the semiconductor optical waveguide devices 100A to 100D may include growing 1002 on the substrate 102 "a base waveguide", which may include one of: the gradient index waveguide 104, the first step index waveguide 114, and the second step index waveguide 124. Then, forming 1004 the first recess 110 in the "base waveguide" by removing the first portion 112 of the base waveguide to the first depth 113. Then, forming 1006 a different one of the gradient index waveguide 104, the first step index waveguide 114, and the second step index waveguide 124 in the first recess 110. Then, forming 1008 the second recess 120 in at least one of the waveguides formed heretofore on the substrate 102, for example the gradient index waveguide 104 and the first step index waveguide 114, or any other two of the three waveguides 104, 114, and 124, by removing the second portion 122 to the second depth 123. Then, forming 1010 the remaining one of the gradient index waveguide 104, the first step index waveguide 114, and the second step index waveguide 124 in the second recess 120. Upon growing the gradient index waveguide 104 and the first 114 and second 124 step index waveguides, the optical path 130 may be formed.

The semiconductor optical waveguide devices 100A to 100D of FIGS. 1A to 1D, respectively, may be grown epitaxially. Refractive index may be precisely controlled during epitaxial growth, providing a smoothly and gradually varying refractive index n. Thus, the transversal bell-shaped refractive index profile 106 may be precisely defined, which enables the length 155A, 155B, and 155C of the gradient index waveguide 104 to be very small, for example 0.1 mm or less, and even 0.05 mm or less. The growth parameter may include, for example and without limitation, reactive gas pressure, deposition rate, ratios of different metal organic precursor gases (for metal organic chemical vapor deposition), or source element crucible temperatures (for molecular beam epitaxy). The gradient index waveguide 104 may include, for example and without limitation, a III-V semiconductor such as, for example, GaAs/AlGaAs InP/InGaAsP, InGaAlAs, InSb, and GaP. Silicon and germanium may also be used.

Figure 3:
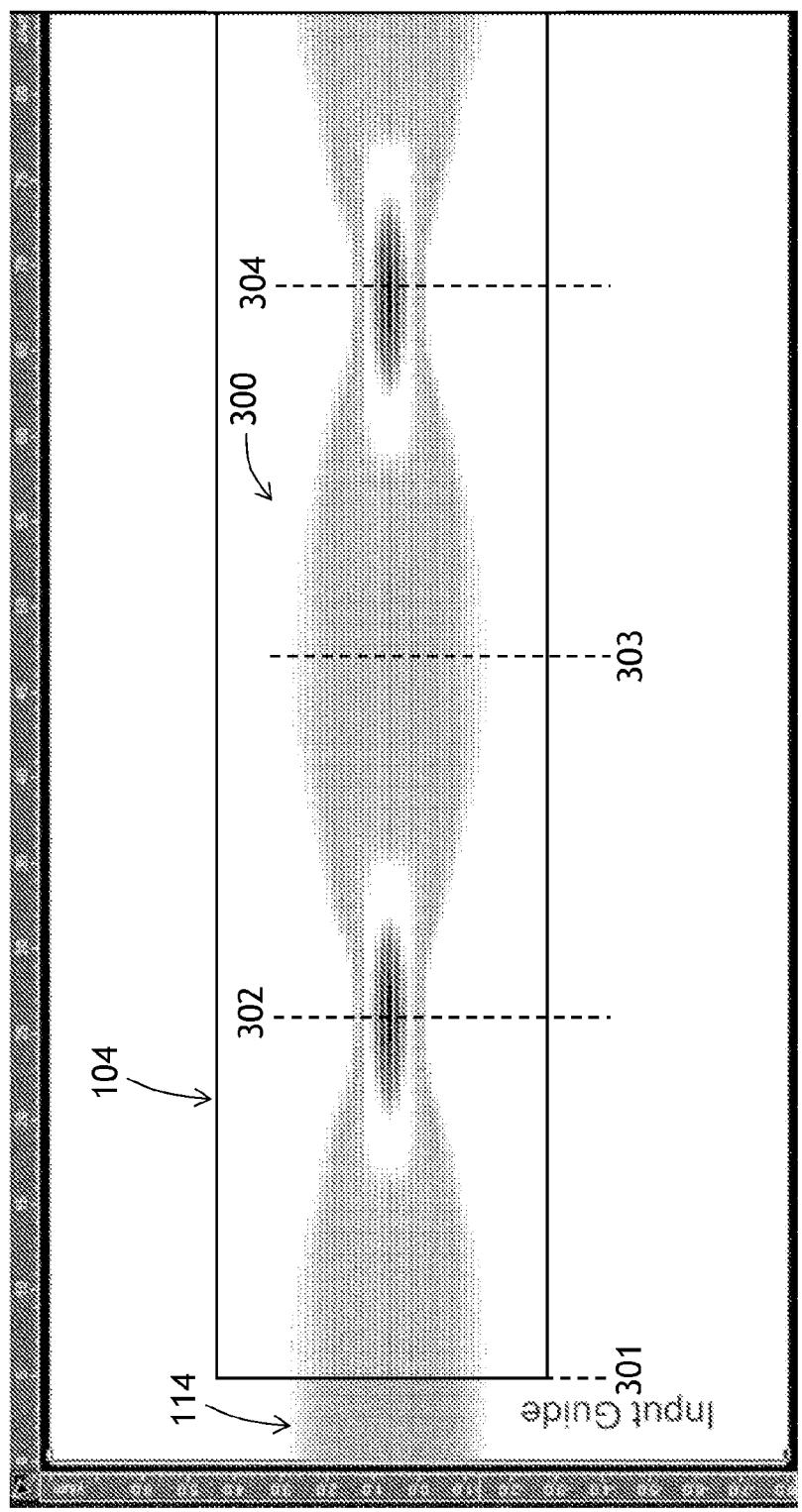
FIG. 3 illustrates a side view of a simulated optical field propagating in a gradient index waveguide having a parabolic vertical refractive index profile.

In one exemplary embodiment, the growth parameter may be varied so that the transversal bell-shaped refractive index profile comprises a substantially parabolic refractive index profile. Referring to FIG. 3, a simulated light field 300 emitted by the first step index waveguide 114 and propagating in the gradient index waveguide 104 is shown for a case where the gradient index waveguide 104 has the refractive index profile 106 of a substantially parabolic shape. In FIG. 3, the vertical scale is between −8.0 and 8.0 micrometers, and the horizontal scale is between 0 and 85 micrometers. The exemplary light field 300 is repetitive. At first 301, second 302, third 303, and fourth 304 locations, the phase front of the exemplary light field 300 is substantially flat, which makes these locations convenient for placing tips of step-index optical waveguides, because guided light fields propagating in non-tapered step index waveguides have substantially planar wavefront within the waveguide core.

Figure 4:
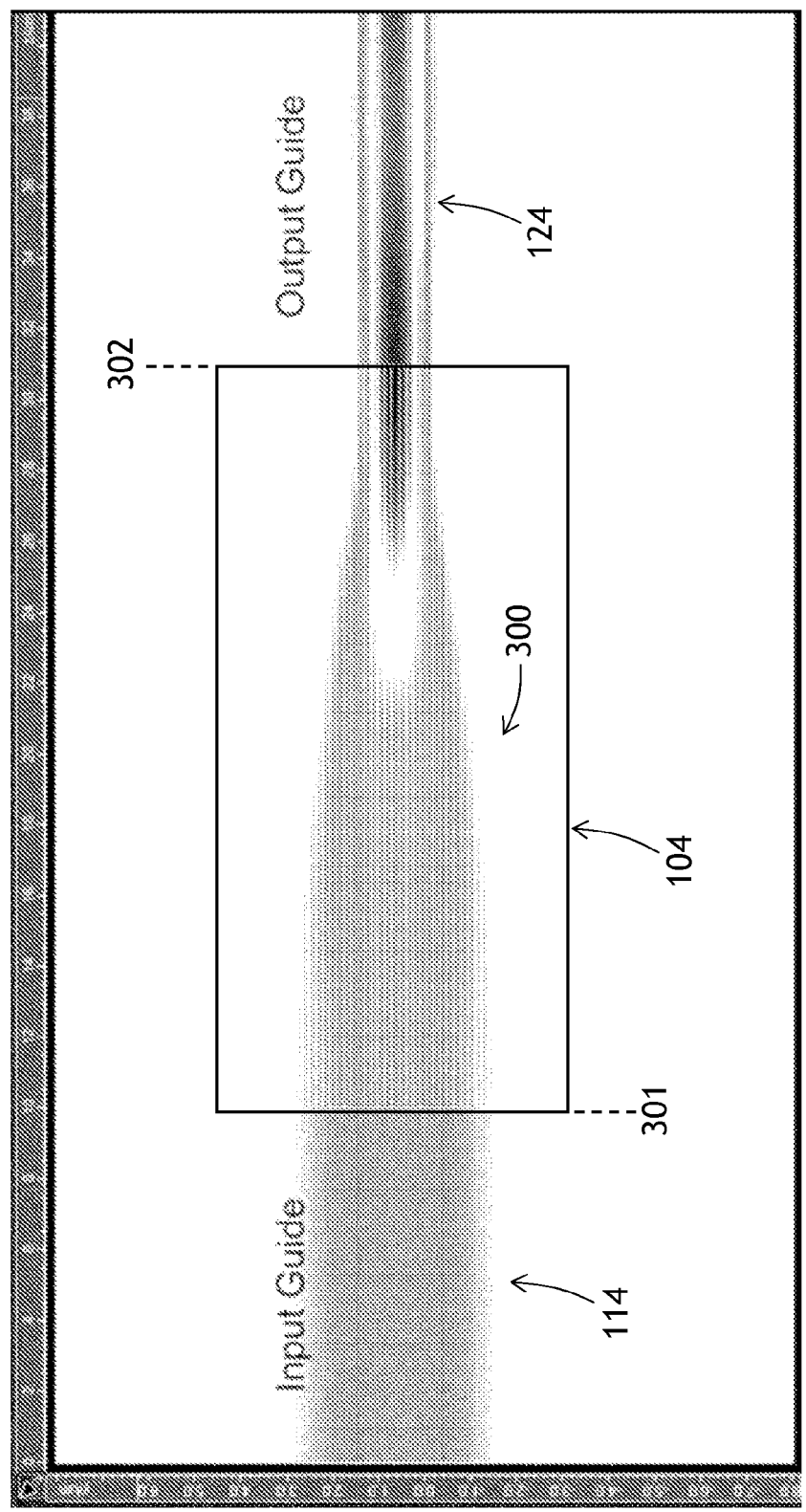
FIG. 4 illustrates a side view of a simulated optical field propagating in a semiconductor optical waveguide mode converter of FIG. 1A, having the gradient index waveguide of FIG. 3.
Figure 5A:
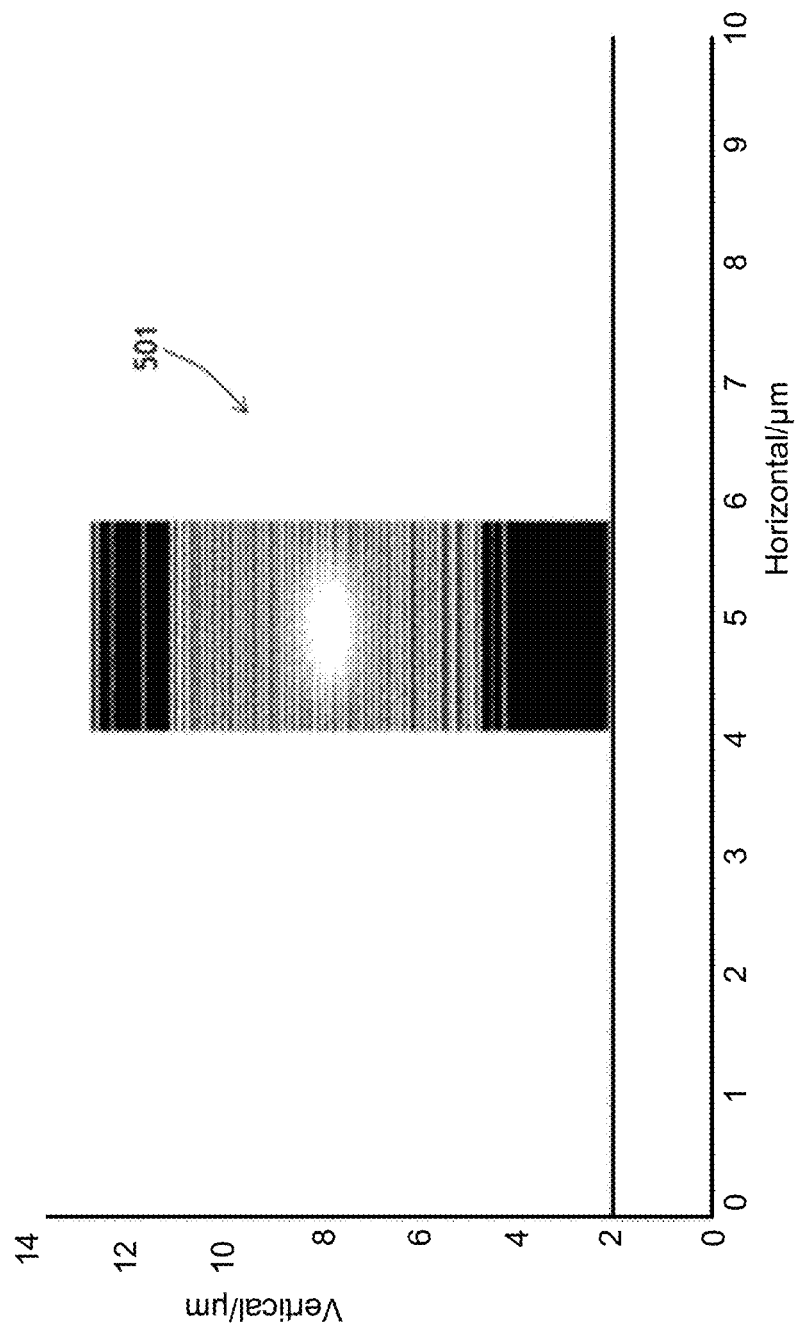
FIG. 5A illustrates a cross-sectional view of a simulated first optical mode propagating in the gradient index waveguide of FIG. 3.
Figure 5B:
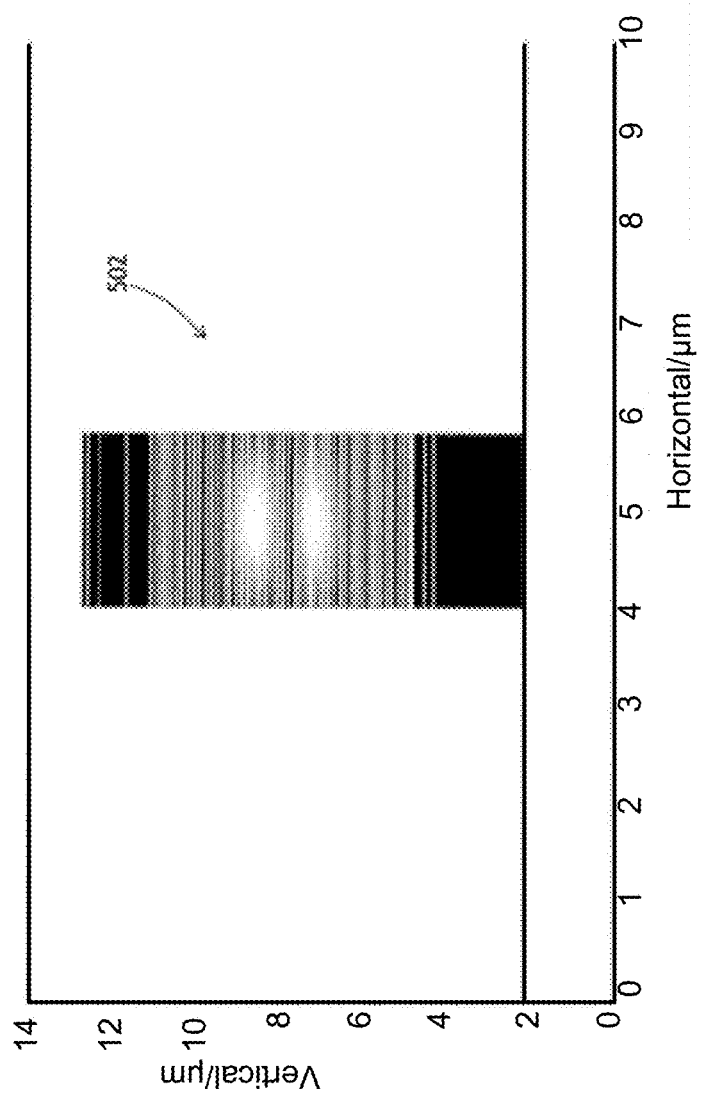
FIG. 5B illustrates a cross-sectional view of a simulated second optical mode propagating in the gradient index waveguide of FIG. 3.
Figure 5C:
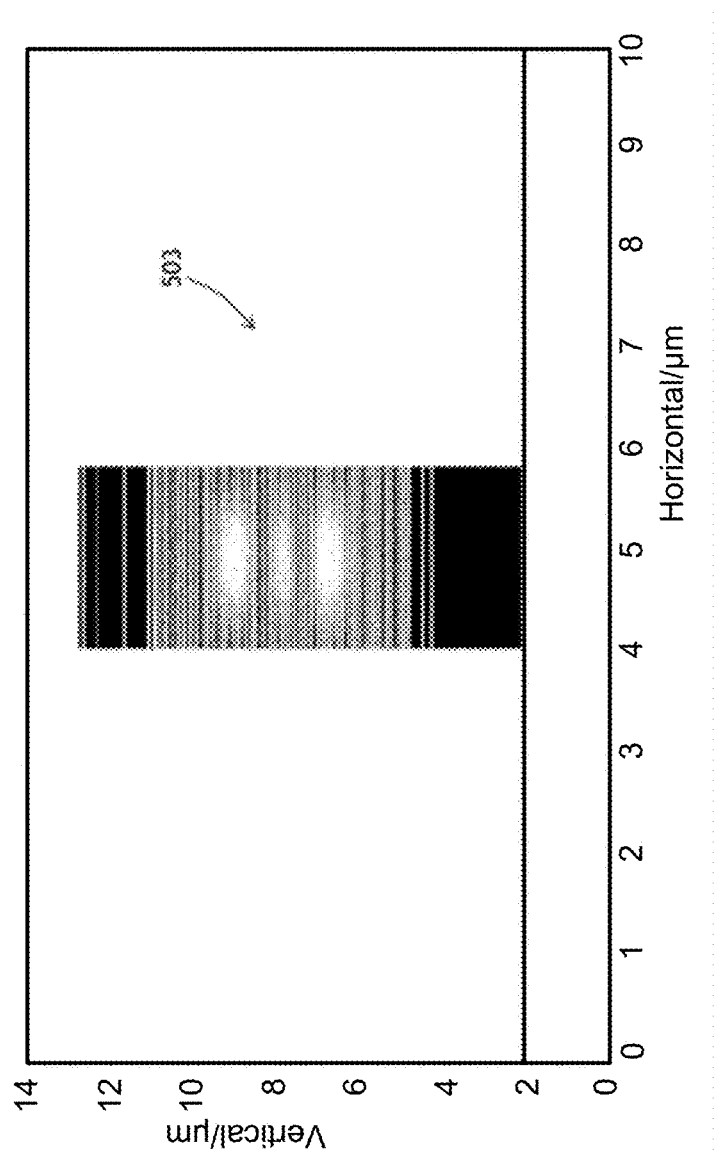
FIG. 5C illustrates a cross-sectional view of a simulated third optical mode propagating in the gradient index waveguide of FIG. 3.
Figure 5D:
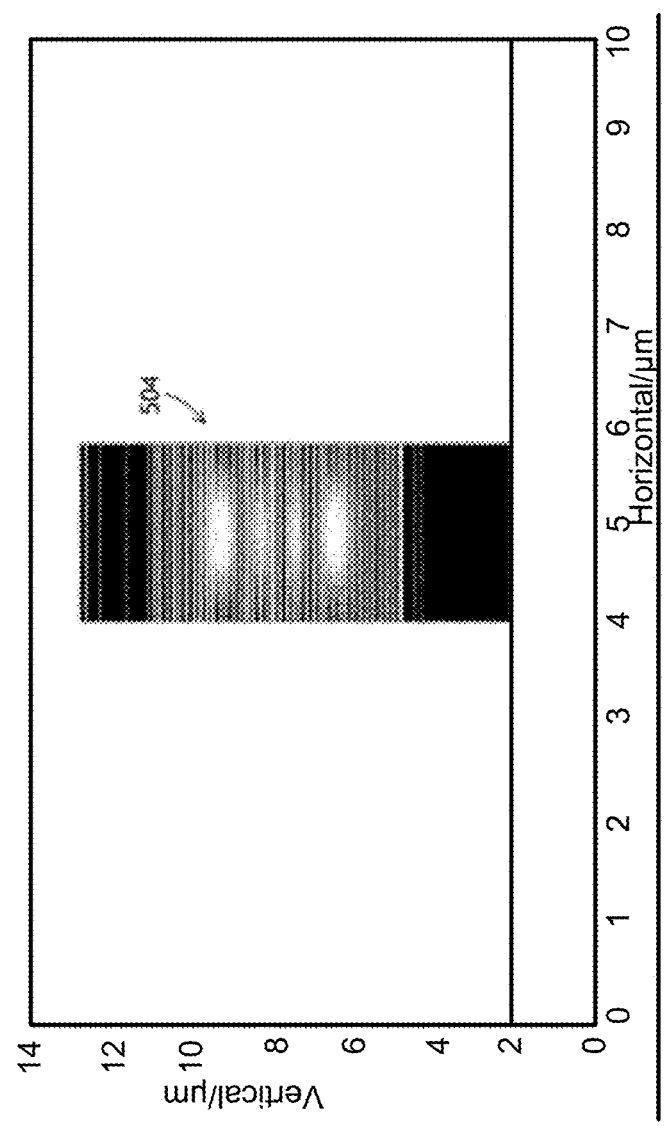
FIG. 5D illustrates a cross-sectional view of a simulated fourth optical mode propagating in the gradient index waveguide of FIG. 3.
Figure 5E:
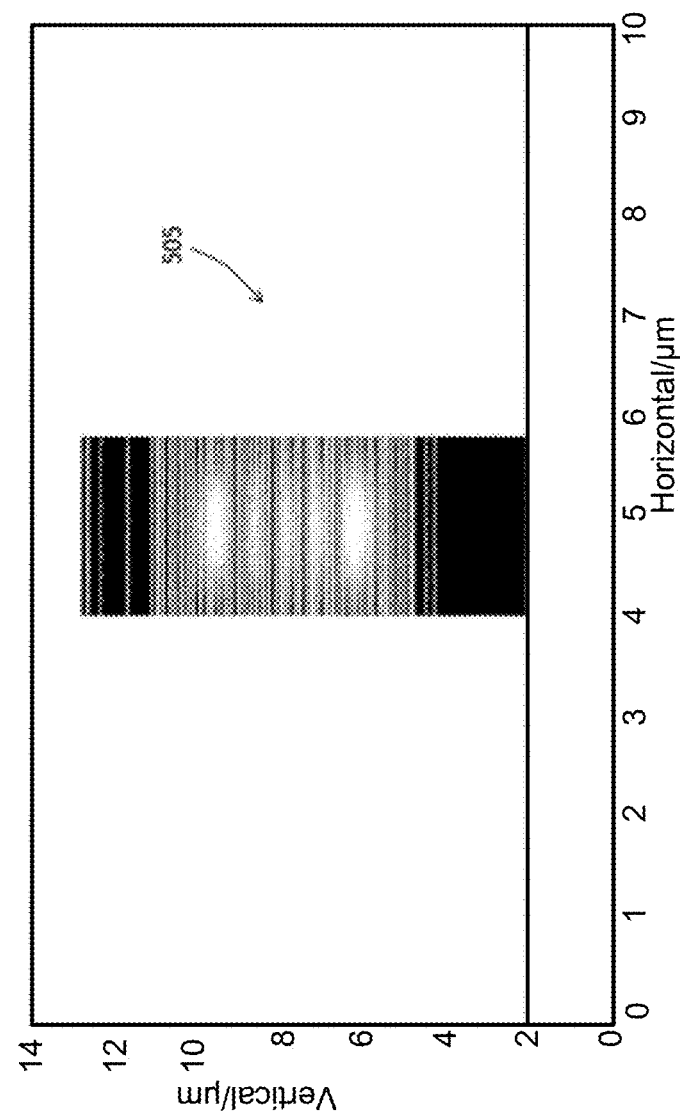
FIG. 5E illustrates a cross-sectional view of a simulated fifth optical mode propagating in the gradient index waveguide of FIG. 3.
Figure 5F:
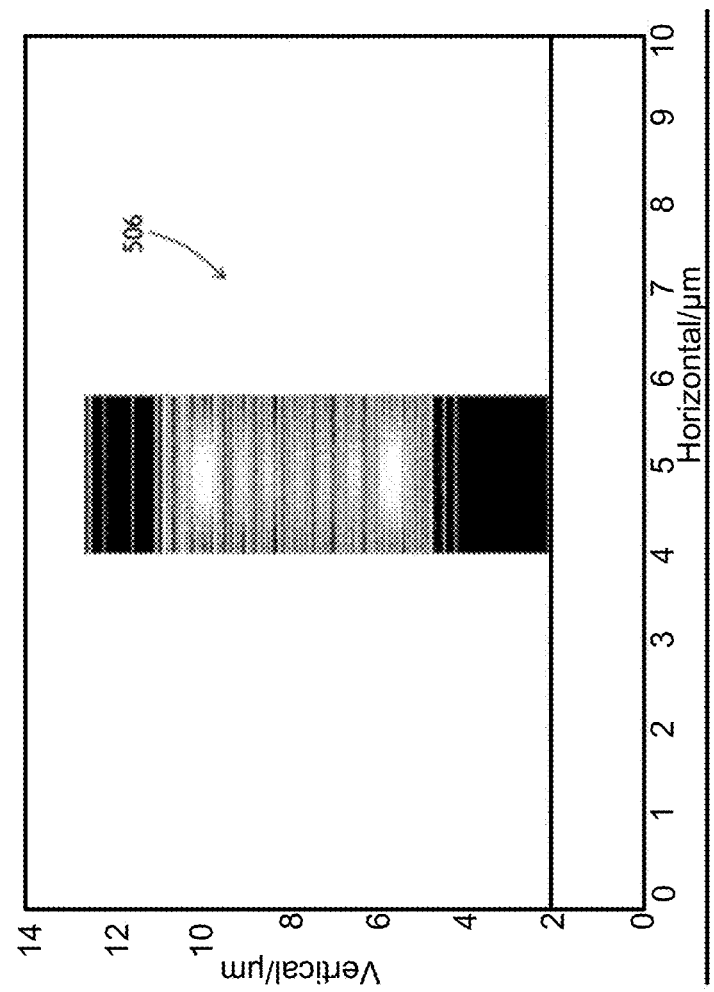
FIG. 5F illustrates a cross-sectional view of a simulated sixth optical mode propagating in the gradient index waveguide of FIG. 3.

Referring now to FIG. 4, the second step index waveguide 124 is placed at the second location 302. FIG. 4 illustrates a computer simulation of the light field 300 propagating in the semiconductor optical waveguide device 100A of FIG. 1A, for the case where the gradually varying bell-shaped refractive index profile 106 has a parabolic shape, or in other words, has a quadratic dependence on vertical coordinate y (thickness) of the gradient index waveguide 104. In FIG. 4, the vertical scale is between −8.0 and 8.0 micrometers, and the horizontal scale between 0 and 40 micrometers.

The parabolic or quadratic dependence n(y) of the gradient index waveguide 104 may be expressed as $$n(y) = n_0 + n_1 y^2 \quad (1)$$

wherein $n_0$ and $n_1$ are constants. Optical modes propagating in the gradient index waveguide 104 having the dependence n(y) given by Eq. (1) will have equidistant effective refractive indices $n_{eff}$, which may be expressed as $$n_{eff}^p = n_{eff}^1 + (p-1)\delta n_{eff} \quad (2)$$

wherein p is the mode number, e.g. 1, 2, 3, 4, and $\delta n_{eff}$ is an effective intermodal refractive index step. In other words, $\delta n_{eff}$ is a refractive index difference between neighboring optical modes. Referring to FIGS. 5A, 5B, 5C, 5D, 5E, and 5F, simulated first 501, second 502, third 503, fourth 504, fifth 505, and sixth 506 optical modes are illustrated as an example, with the vertical (y) and horizontal (x) scales shown in micrometers.

Figure 6:
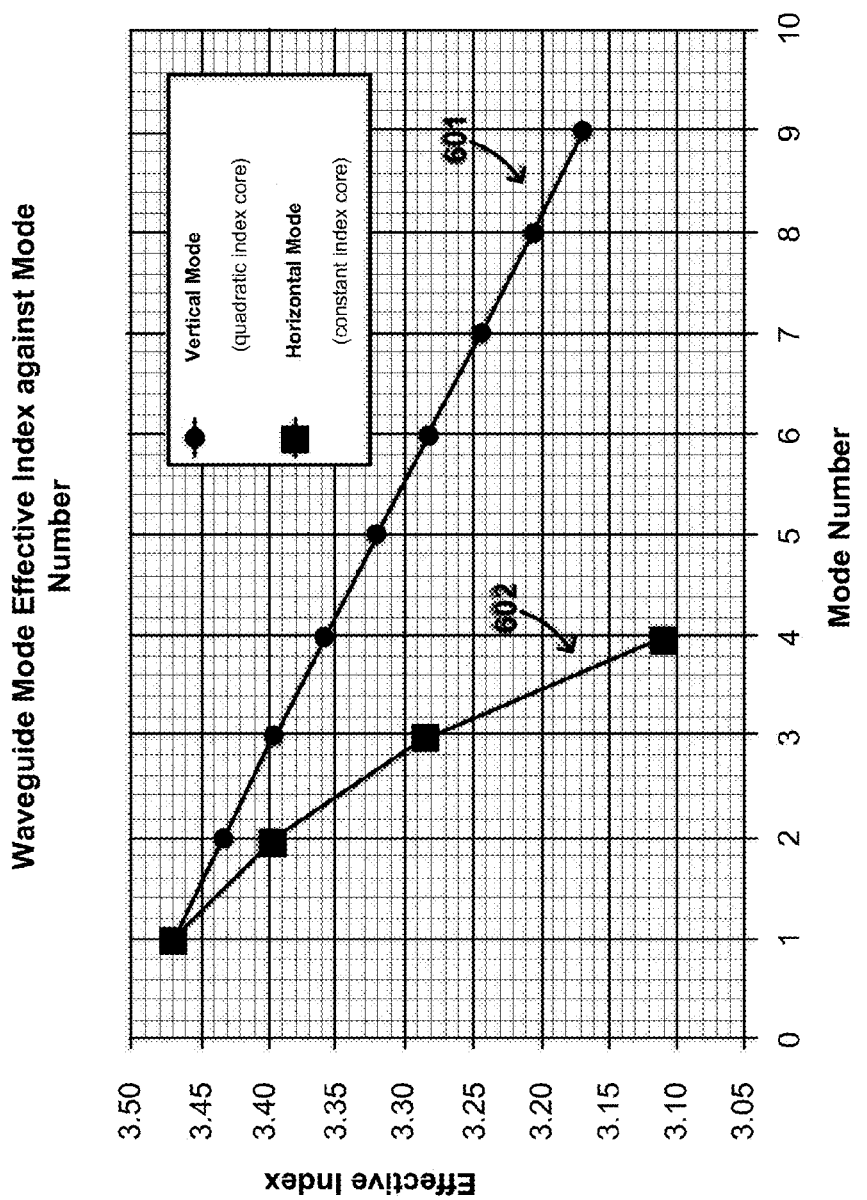
FIG. 6 illustrates a calculated dependence of an effective refractive index $n_{eff}$ on vertical and horizontal mode numbers.

Turning to FIG. 6, a calculated dependence 601 of an effective refractive index $n_{eff}$ on vertical mode numbers is linear. A calculated dependence 602 of an effective refractive index $n_{eff}$ on horizontal mode numbers is non-linear, being approximately quadratic. In the calculation of FIG. 6, the dependence of the refractive index n on the vertical coordinate y is quadratic as given by Eq. (1), while in the horizontal direction x, the refractive index n is constant.

Light propagating in the gradient index waveguide 104 having the refractive index vertical profile 106 represented by Eq. (1) may include a sum of modes, for example the modes 501 to 506 of FIGS. 5A to 5F respectively, each mode 501 to 506 having its own exponential propagation term depending on the corresponding $n_{eff}$ given by Eq. (2):

$$E(x, y, z) = \sum_{p=1}^{N} E_p(x, y) \exp(j n_{eff}^p k_0 z) \quad (3)$$

wherein N is the total number of modes, $k_0$ is the wavenumber in free space, $j\sqrt{1}$ and z is the propagation direction coordinate. The number of modes N may be at least two or at least three. In one embodiment, the number of modes N may be no greater than sixteen.

Since the modes 501 to 506 have uniformly spaced effective refractive indices $n_{eff}$, the optical field may have a period (or repeat length) L, wherein $L = 2\pi/\delta n_{eff} k_0$, because $$\sum_{p=1}^{N} \exp(j n_{eff}^p k_0 2L) = \exp(j n_{eff}^1 k_0 2L) \sum_{p=1}^{N} \exp(j(p-1)\delta n_{eff} k_0 2L) \quad (4)$$

Figure 7A:
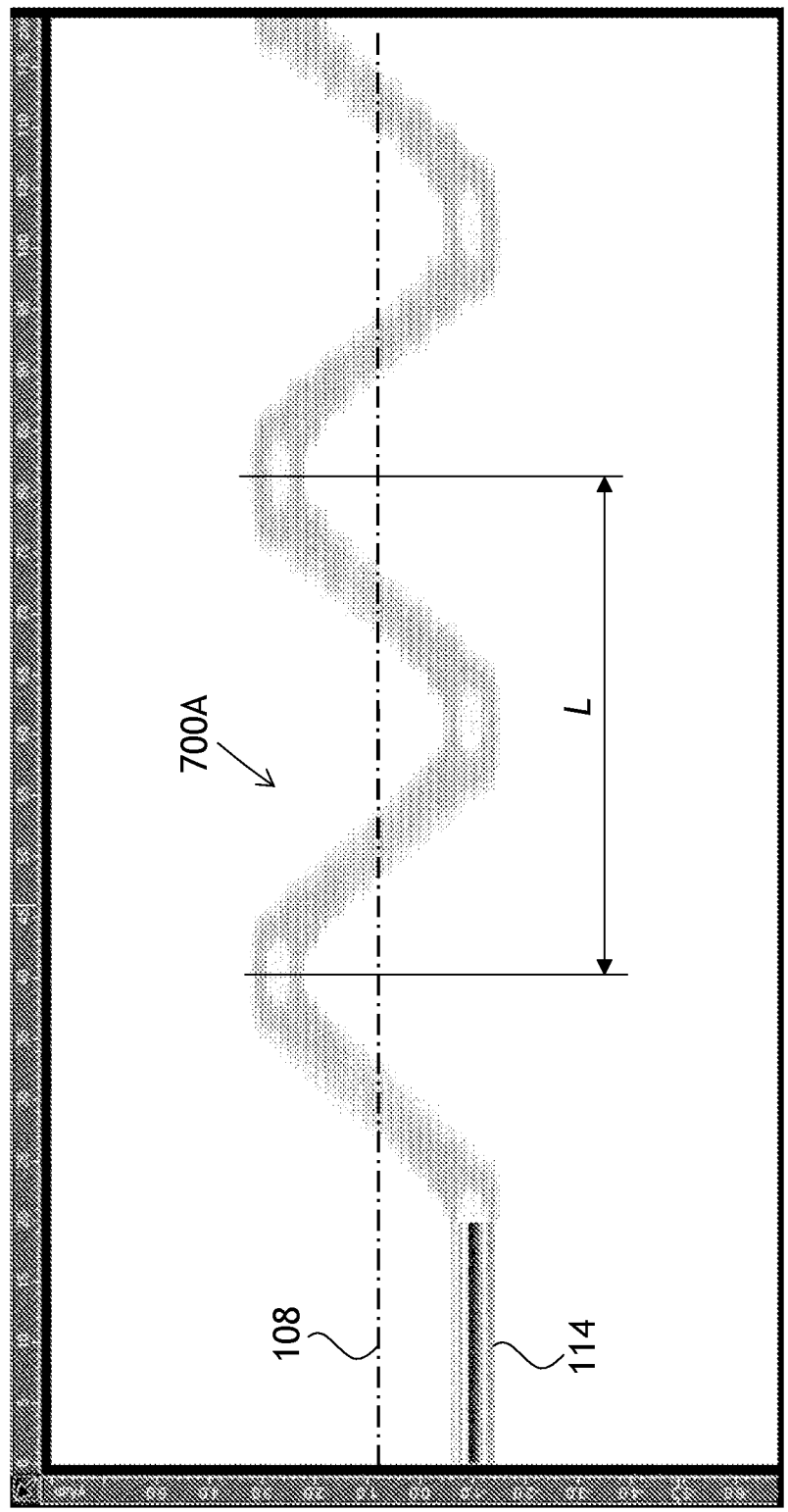
FIG. 7A illustrates an elevational view of a simulated optical field having a large vertical offset of a narrow input optical field relative to an optical axis of the gradient index waveguide of FIG. 3.
Figure 7B:
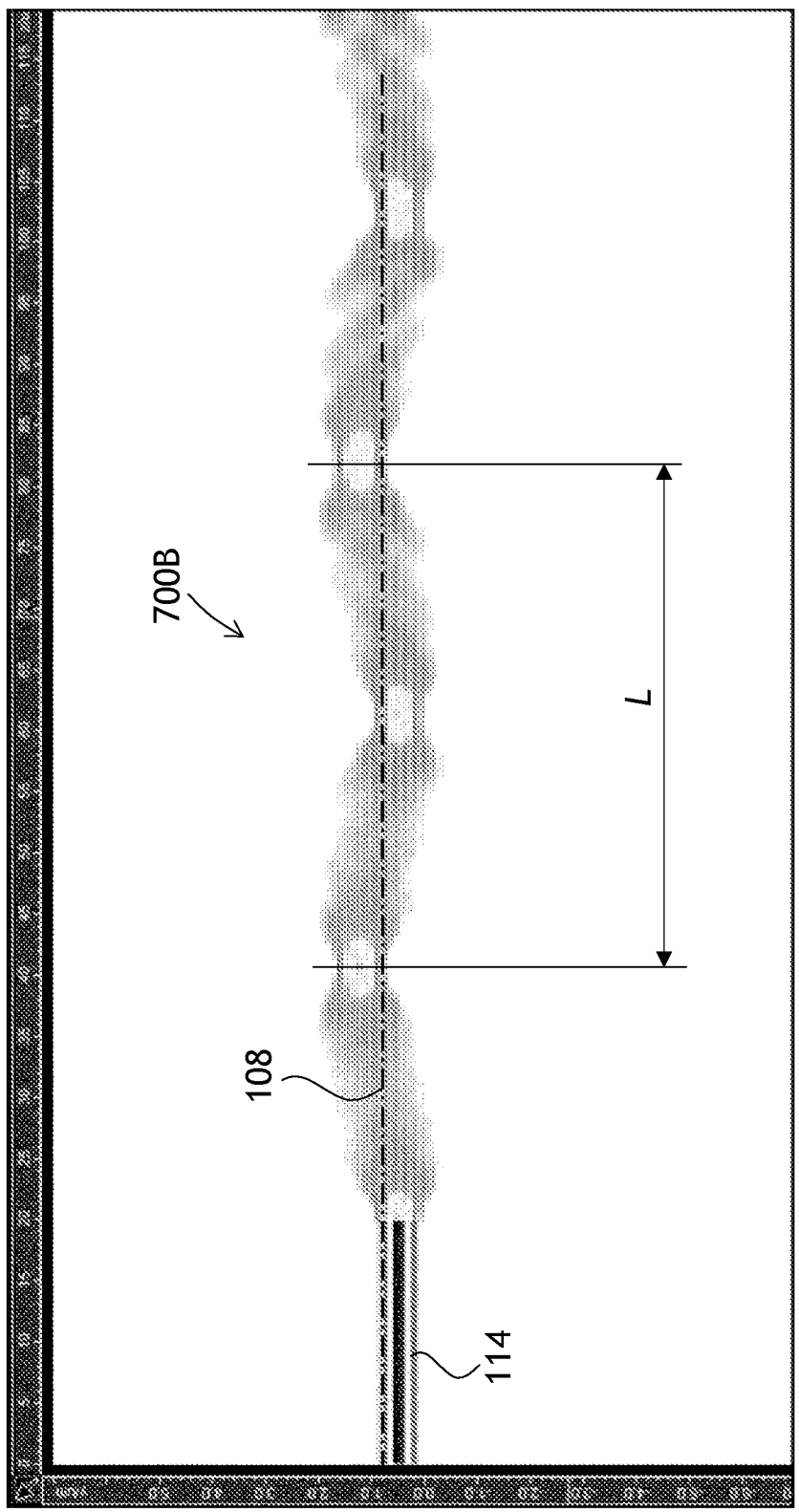
FIG. 7B illustrates an elevational view of a simulated optical field having a medium vertical offset of a narrow input optical field relative to an optical axis of the gradient index waveguide of FIG. 3.
Figure 7C:
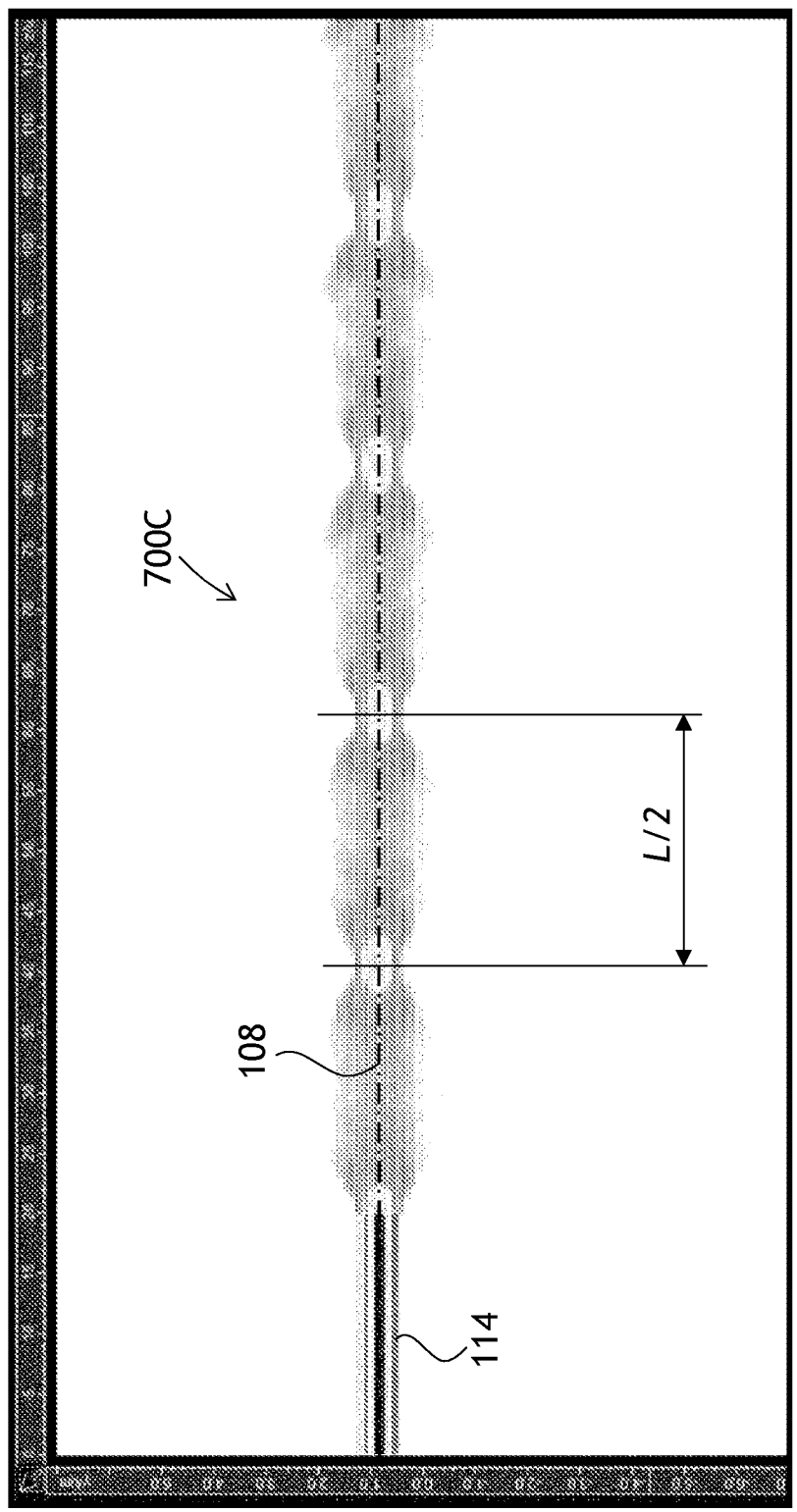
FIG. 7C illustrates an elevational view of a simulated optical field having a zero vertical offset of a narrow input optical field relative to an optical axis of the gradient index waveguide of FIG. 3.

The periodic character of the light field 300 (FIGS. 3 and 4) may be further illustrated by FIGS. 7A to 7C. In FIGS. 7A to 7C, the vertical scale is between −7.0 and 7.0 micrometers, and the horizontal scale is between 0 and 116 micrometers. The optical axis 108, corresponding to the maximum 109 of the gradually varying parabolic refractive index profile 106, is disposed at the vertical coordinate y of 0.9 micrometers. The core 116 of the input step-index waveguide 114 is disposed at −1.0 micrometers in FIG. 7A, at 0.5 micrometers in FIG. 7B, and at 0.9 micrometers (on-axis) in FIG. 7C. One can see that light fields 700A (FIG. 7A) and 700B (FIG. 7B) have a repeat period of L≈41 micrometer, whereas a light field 700C (FIG. 7C) has a repeat period of L/2≈20.5 micrometers. This is because in case of FIG. 7C, the excited light field 700C may only include even modes, which effectively doubles the effective intermodal refractive index step $\delta n_{eff}$ between neighboring optical modes.

Figure 8A:
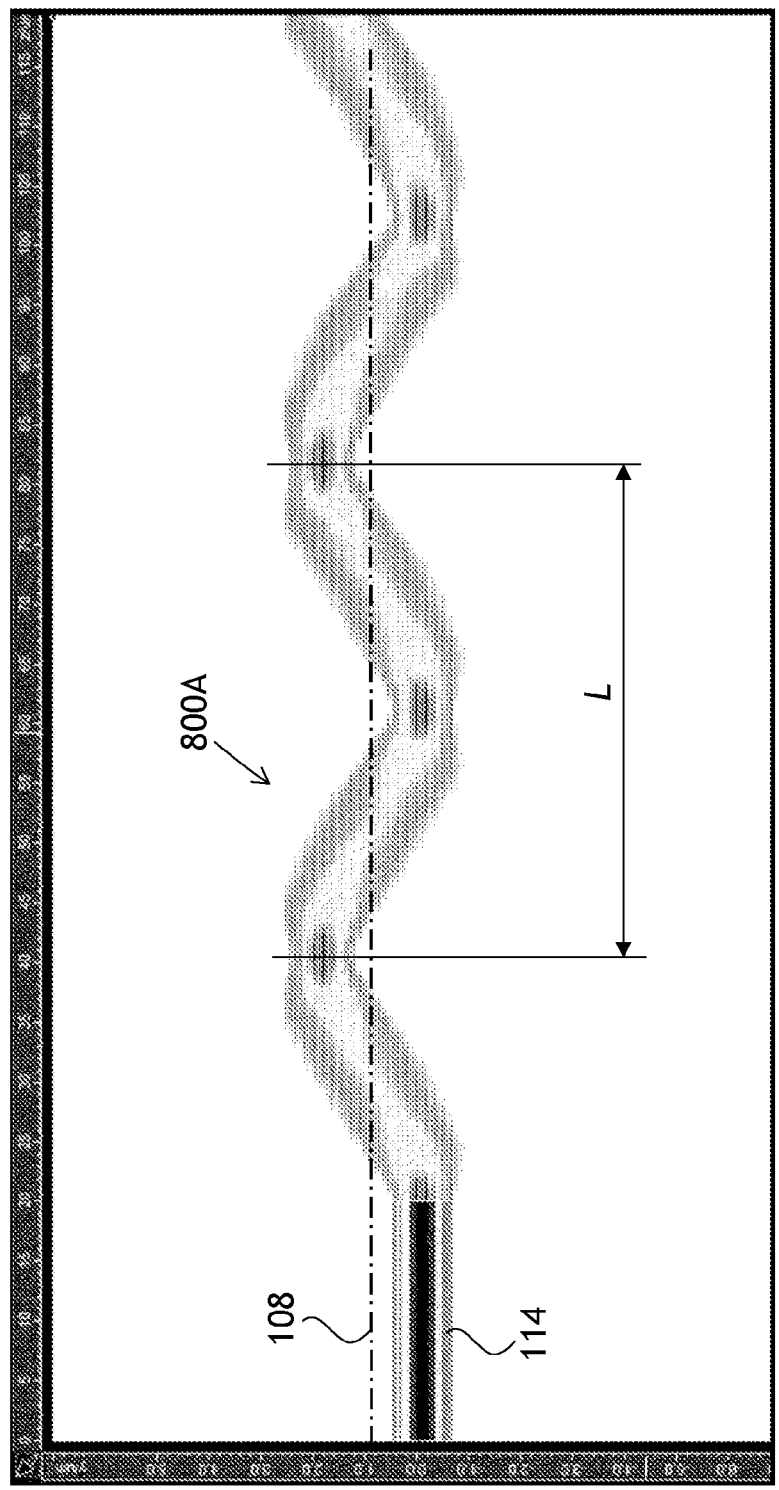
FIG. 8A illustrates an elevational view of a simulated optical field having a non-zero vertical offset of a wide input optical field relative to the optical axis of the gradient index waveguide of FIG. 3.
Figure 8B:
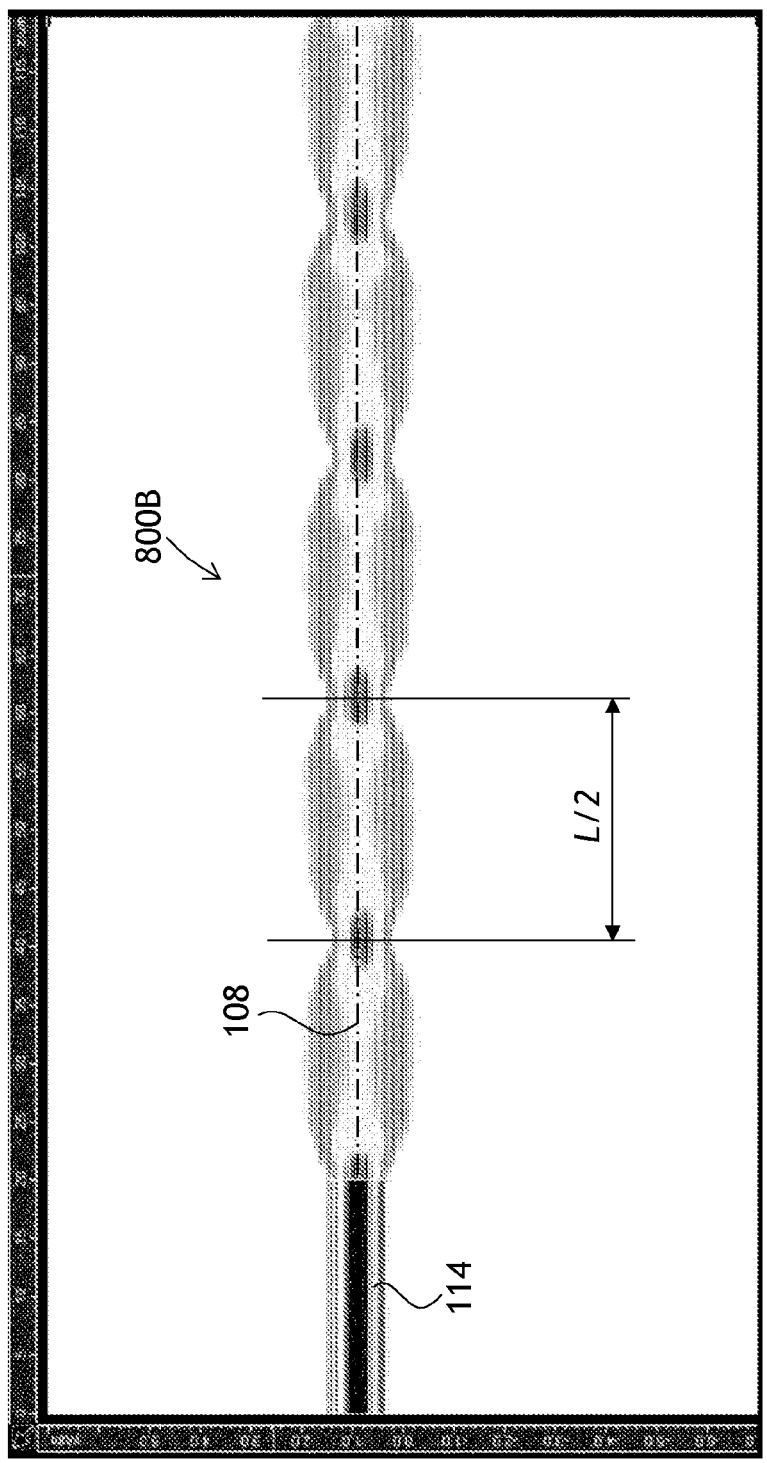
FIG. 8B illustrates an elevational view of a simulated optical field having a zero vertical offset of a wide input optical field relative to the optical axis of the gradient index waveguide of FIG. 3.

Referring to FIGS. 8A and 8B with further reference to FIGS. 7A and 7C, FIGS. 8A and 8B illustrate results of similar computations as those represented by FIGS. 7A and 7C, respectively, and have the same geometrical scale. In the case of FIGS. 8A and 8B, larger input optical fields are used than in the case of FIGS. 7A and 7C. Similarly to FIGS. 7A and 7C, an asymmetrically launched light field 800A has a repeat period of L≈41 micrometers, whereas a symmetrically launched light field 800B has a repeat period of L/2≈20.5 micrometers.

The above simulation results indicate that, for the substantially parabolic transversal bell-shaped refractive index profile 106 characterized by the repeat length L of an optical field (e.g. 300 of FIG. 3) propagating in the gradient index waveguide 104, the length 155A (FIG. 1A) of the gradient index waveguide 104 between the first 114 and second 124 step index waveguides may be substantially equal to LM/4, wherein M is an integer. This is because for an on-axis first 114 and second 124 step index waveguides, the repeat period is L/2 and one needs one half of that value, that is L/4, to obtain a mode size transformation. More generally, to obtain a mode size transformation, M may need to be an odd number, e.g. 1, 3, 5, . . . , with the length 155A substantially equal to LM/4. To merely obtain a vertical translation, such as in the semiconductor optical waveguide device 100B of FIG. 1B, M may need to be an even number, e.g. 2, 4, 6, . . . . Furthermore, for the reflective semiconductor optical waveguide device 100C of FIG. 1C, the length 155C of the gradient index waveguide 104 between the first 114 and second 124 step index waveguides may be substantially equal to LM/4, wherein M is an odd integer.

Figure 9A:
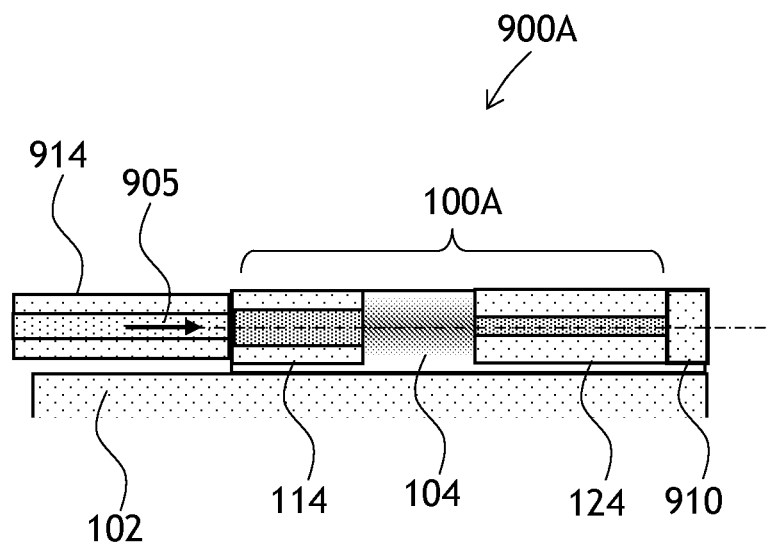
FIG. 9A illustrates an elevational cross-sectional view of a fiber-coupled photodetector including the semiconductor optical waveguide device of FIG. 1A.

Referring now to FIG. 9A, a fiber-coupled photodetector 900A may include the semiconductor optical waveguide device 100A of FIG. 1A, an optical fiber 914 butt-coupled to the first step index waveguide 114, and a photodetector 910 optically coupled to the second step index waveguide 124. In operation, an optical signal 905 propagates in the optical fiber 914, and is coupled to the first step index waveguide 114. The optical mode sizes of the optical fiber 914 and the first step index waveguide 114 are similar, so that optical coupling loss may not be significant e.g. less than 1 dB. The gradient index waveguide 104 may effectively convert the optical mode size from the size of the first step index waveguide 114 to the size of the second step index waveguide 124, which is optically coupled to the photodetector 910 for detecting the optical signal 900A. The fiber-coupled photodetector 900A may be manufactured by following the steps described above with reference to FIGS. 2A to 2F, followed by a step of butt-coupling the optical fiber 914 to the first step index waveguide 114.

Figure 9B:
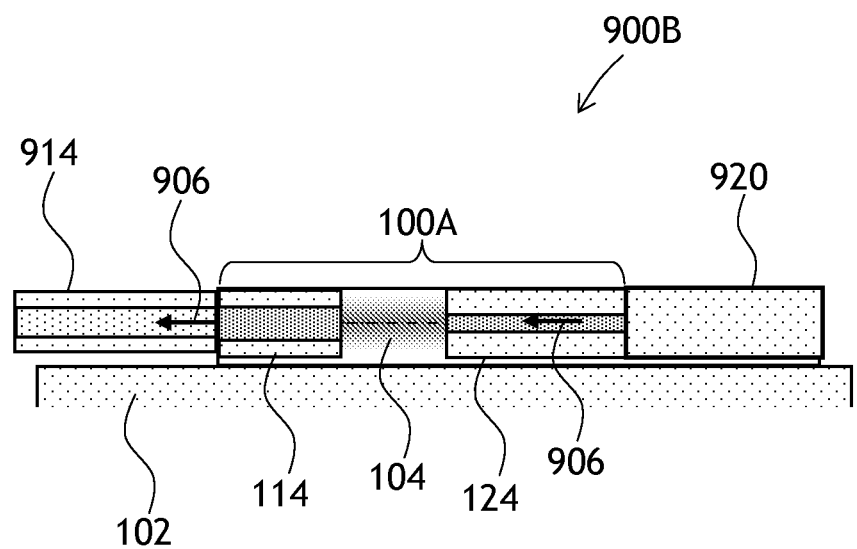
FIG. 9B illustrates an elevational cross-sectional view of a fiber-coupled optical modulator including the semiconductor optical waveguide device of FIG. 1A.

Turning to FIG. 9B, a fiber-coupled optical modulator 900B may include the semiconductor optical waveguide device 100A of FIG. 1A, the optical fiber 914 butt-coupled to the first step index waveguide 114, and an optical modulator 920, for example electro-absorption or Mach-Zehnder optical modulator, optically coupled to the second step index waveguide 124. In operation, a modulated optical signal 906 propagates in the second step index waveguide 124, and is coupled to the first step index waveguide 114 by the gradient index waveguide 104, with a corresponding mode size transformation. The larger mode size of the first step index waveguide 114 may enable a low-loss, e.g. less than 1 dB, optical coupling to the optical fiber 914.

The present disclosure is not to be limited in scope by the specific embodiments described herein. Indeed, other various embodiments and modifications, in addition to those described herein, will be apparent to those of ordinary skill in the art from the foregoing description and accompanying drawings. For example, in FIGS. 2C-2F, the index profiles 214, 224 are illustrated as single steps; however, the step index profiles may have multiple steps, for example, when the step index waveguides 114, 124 comprise more than three layers. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A semiconductor optical waveguide device comprising:
a substrate;
a first step index waveguide on the substrate,
a core of the first step index waveguide comprising a first core thickness and a first refractive index;
a gradient index waveguide on the substrate,
the gradient index waveguide abutting the first step index waveguide, and
the gradient index waveguide comprising a length and a transversal gradually varying bell-shaped refractive index profile defining an optical axis comprising a maximum value of the transversal gradually varying bell-shaped refractive index profile; and
a second step index waveguide over the substrate,
the second step index waveguide abutting the gradient index waveguide, and
a core of the second step index waveguide comprising a second core thickness and a second refractive index.

2. The semiconductor optical waveguide device of claim 1, where
the gradient index waveguide includes a first side and a second side,
the second side is opposite the first side,
the first step index waveguide abuts the first side of the gradient index waveguide, and
the second step index waveguide abuts the second side of the gradient index waveguide.

3. The semiconductor optical waveguide device of claim 2, where a length of the gradient index waveguide between the first side and the second side is no greater than 0.1 mm.

4. The semiconductor optical waveguide device of claim 1, where
the core of the first step index waveguide and the core of the second step index waveguide are centered on the optical axis, and
the semiconductor optical waveguide device further comprises an optical fiber butt-coupled to the first step index waveguide.

5. The semiconductor optical waveguide device of claim 1, further comprising:
at least one of a photodetector or an optical modulator on the substrate,
the at least one of the photodetector or the optical modulator being optically coupled to the second step index waveguide.

6. The semiconductor optical waveguide device of claim 1, where
the transversal gradually varying bell-shaped refractive index profile comprises a substantially parabolic refractive index profile having a repeat length L of an optical field propagating in the gradient index waveguide, and
the length of the gradient index waveguide between the first step index waveguide and the second step index waveguide is LM/4, where M is an integer.

7. The semiconductor optical waveguide device of claim 6, where
the optical field comprises at least two optical modes, and $$L=2\pi/\delta n_{\mathit{eff}} k_0, \text{ where}$$

$\delta n_{\mathit{eff}}$ is an effective intermodal refractive index step between the at least two optical modes, and
$k_0$ is a wavenumber of a zero-order optical mode for propagating in the gradient index waveguide.

8. The semiconductor optical waveguide device of claim 6, where
M is an odd number, and
at least one of:
the first core thickness is greater than the second core thickness, or
the first refractive index is less than the second refractive index.

9. The semiconductor optical waveguide device of claim 1, where
a center of the core of the first step index waveguide is disposed on a first side of the optical axis, and
a center of the core of the second step index waveguide is disposed on a second side of the optical axis,
the second side of the optical axis being opposite the first side of the optical axis.

10. The semiconductor optical waveguide device of claim 1, where the gradient index waveguide comprises a III-V semiconductor.

11. The semiconductor optical waveguide device of claim 1, where
the first step index waveguide is disposed under the second step index waveguide, the first and second step index waveguides abut the gradient index waveguide on a first side of the gradient index waveguide; and the semiconductor optical waveguide device further comprises:

a mirror surface optically coupled to a second side of the gradient index waveguide, the second side being opposite the first side such that light emitted by the first step index waveguide:

propagates through the gradient index waveguide, is reflected by the mirror surface, propagates back through the gradient index waveguide, and impinges on the second step index waveguide.

12. The semiconductor optical waveguide device of claim 1, where the transversal gradually varying bell-shaped refractive index profile comprises a substantially parabolic refractive index profile having a repeat length L of an optical field propagating in the gradient index waveguide, and the length of the gradient index waveguide between the first step index waveguide and the second step index waveguide is LM/4, where M is an integer.

13. The semiconductor optical waveguide device of claim 1, where the gradient index waveguide comprises a first gradient index waveguide portion and a second gradient index waveguide portion, the second gradient index waveguide portion abutting the first gradient index waveguide portion, the first gradient index waveguide portion comprises a transversal gradually varying bell-shaped refractive index profile comprising a first width, the second gradient index waveguide portion comprises a transversal gradually varying bell-shaped refractive index profile comprising a second width, and the first width is greater than the second width.

14. The semiconductor optical waveguide device of claim 1, where the first step index waveguide is disposed under the second step index waveguide.

15. A semiconductor optical waveguide device comprising:

a substrate;

a first waveguide on the substrate, a core of the first waveguide comprising a first core thickness and a first refractive index;

a second waveguide on the substrate, the second waveguide abutting the first waveguide and comprising a length and a transversal gradually varying bell-shaped refractive index profile defining an optical axis comprising a maximum value of the transversal gradually varying bell-shaped refractive index profile; and a third waveguide over the substrate, the third waveguide abutting the second waveguide, and a core of the third waveguide comprising a second core thickness and a third refractive index.

16. The semiconductor optical waveguide device of claim 15, where the transversal gradually varying bell-shaped refractive index profile comprises a repeat length L of an optical field propagating in the second waveguide, and a length of the second waveguide between the first waveguide and the third waveguide is LM/4, where M is an integer.

17. The semiconductor optical waveguide device of claim 15, where at least one of:

the first core thickness is greater than the second core thickness, or the first refractive index is less than the third refractive index.

18. The semiconductor optical waveguide device of claim 15, where the second waveguide includes a first side and a second side, the second side opposite the first side, and the first waveguide abuts the first side of the second waveguide and the third waveguide abuts the second side of the second waveguide.

19. The semiconductor optical waveguide device of claim 15, further comprising:

at least one of a photodetector or an optical modulator on the substrate, the at least one of the photodetector or the optical modulator being optically coupled to the third waveguide.

20. The semiconductor optical waveguide device of claim 15, where a center of the core of the first waveguide is disposed on a first side of the optical axis, and a center of the core of the third waveguide is disposed on a second side of the optical axis, the second side of the optical axis being opposite the first side of the optical axis.

* * * * *